United States Patent Office 3,087,045
Patented Apr. 23, 1963

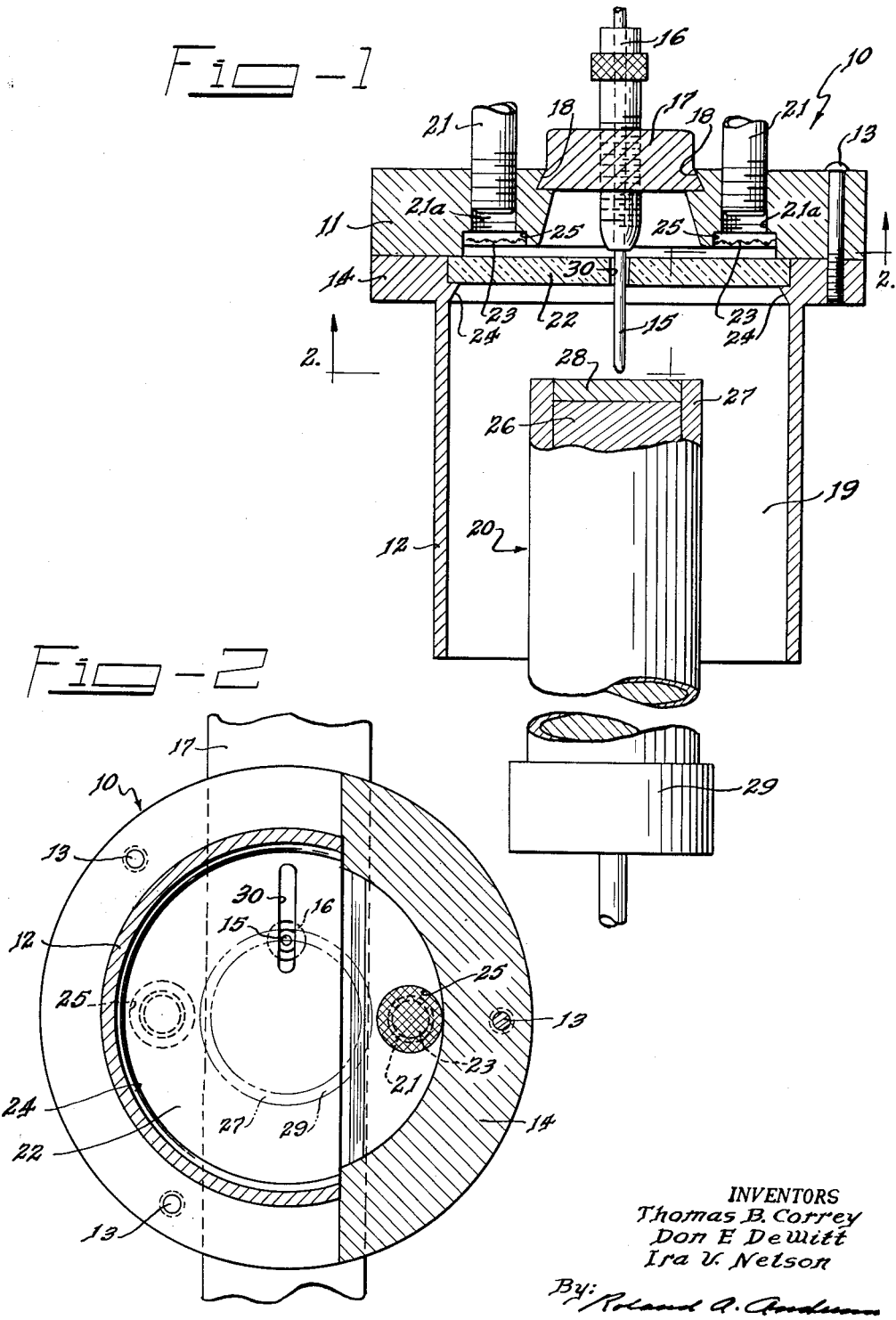

3,087,045
WELDING APPARATUS
Thomas B. Correy, Don E. DeWitt, and Ira V. Nelson, all of Richland, Wash., assignors to the United States of America as represented by the United States Atomic Energy Commission
Filed July 5, 1961, Ser. No. 122,045
1 Claim. (Cl. 219—74)

This invention relates to a welding apparatus and, more particularly, to an arrangement for supplying inert gas to a welding chamber.

When welding is to be performed in an inert atmosphere, it is necessary that the welding chamber be purged of air. This operation may be time-consuming because of the tendency of the inert gas to mix with the air being removed from the welding chamber.

We have invented an arrangement for supplying inert gas to a welding chamber in such a way that the inert gas moves from one end of the chamber as a column or a piston occupying substantially the entire area of the chamber and pushes out, in front of it, the air in the chamber. Thus mixing of the inert gas and the air is kept to a minimum, and the removal of the air from the welding chamber takes place in a relatively short time. As movement of inert gas through the welding chamber continues during the welding operation, there is an absence of turbulence and back flow of gas in the welding chamber, which would make the weld irregular by interfering with the quality of the welding arc.

In the drawing:

FIG. 1 is a longitudinal sectional view through the welding apparatus of the present invention; and FIG. 2 is a transverse sectional view taken on the line 2—2 of FIG. 1.

A welding hood or casing 10 comprises a top piece 11 and a hollow cylindrical member 12 depending therefrom and forming impervious side walls. The hollow member 12 is joined to the top piece 11 by means of screws 13 which pass through the top piece and are threaded into a flange 14 formed on the hollow member. The top piece 11 constitutes a mounting plate for a welding electrode 15, which is carried by, and insulated from, a fitting 16 threaded into a slide 17 sealingly engaging the top piece 11 in undercut grooves 18 formed therein.

The slide 17 is adjustable lengthwise, or transverse to the plane of the paper in FIG. 1, to adjust the electrode 15 radially of a welding chamber 19 formed by the hood 10 and thus to accommodate the electrode to various sizes of an object 20 to be welded at or near its periphery at one end. The welding chamber 19 is closed at its upper end and open at its lower end. An inert gas such as argon or helium is supplied to the chamber 19 through lines 21 connected to openings 21a in the top piece 11.

Important parts of the present apparatus are a porous ceramic plate 22 and screens 23, which control the inert gas as it enters and moves through the welding chamber 19. The porous plate 22 is located adjacent the top plate 11, being clamped between the top plate and a shoulder 24 formed on the interior of the hollow member 12. The screens 23 are positioned above, and somewhat spaced from the porous plate 22, being mounted in counterbores 25 in the openings 21a in the top plate 11. Thus, gas delivered through the lines 21 must pass successively through the screens 23 and the porous plate 22 in order to reach the welding chamber 19.

The porous plate 22 assures that the inert gas coming from the lines 21 to the welding chamber 19 moves into the chamber in largely collimated flow and thus acts essentially as a piston in sweeping out the air in the chamber with a minimum of mixing of the inert gas and the air. Thus, the purging of the air from the chamber 19, which is performed before welding, occurs relatively rapidly. The screens 23 provided at the lines 21 diffuse the gas coming from the lines and spread it over to the porous plate 22 and thus better enable the porous plate to pass the gas as a piston generally completely across the cylindrical member 12. In the absence of the screens 23 the gas might go through the porous plate 22 in greater amounts directly below the lines 21. Thus, greater mixing of the inert gas and air in the chamber 19 might occur, with more time required for purging the chamber of air. Supplying the inert gas to the chamber 19 through two diametrally opposite spaced openings 21a increased the uniformity of distribution of the gas over the porous plate 22.

The object 20 to be welded may be a nuclear-fuel element comprising an uranium-containing core 26, a cylindrical jacket 27, and a closure member 28 both formed of a zirconium alloy. The weld is produced between the jacket 27 and the closure member 28, as is evident from FIG. 2, which shows the electrode 15 positioned at the contacting regions of the jacket and end closure (shown in phantom in FIG. 2). During the welding operation, the electrode 15, which may be of tungsten, is held against rotation, and the fuel element is rotated by a holder 29, which engages it and is in turn rotated by means not shown. An electric current is passed through the fuel element and the electrodes 15, and a welding arc is struck therebetween by moving them apart the appropriate amount.

In one example, the welding chamber 19 has a length of 3 5/8" and a diameter of 3". The porous plate 22 is 1/4" thick and spaced 1/8" from the screens 23. In this example, the hood 10 is formed of aluminum and may have a viewing window (not shown), through which the welding operation may be observed.

As is evident, the electrode 15 extends through a narrow slot 30 in the porous plate 22, which slot is long enough to permit the electrode the adjustment needed for different diameters of the object 20.

It will be understood that the invention is not to be limited to the details given herein but that it may be modified within the scope of the appended claim.

What is claimed is:

Welding apparatus comprising a cylindrical hood having a top and depending side walls, the top being provided with two gas inlets located at about the same distance from the center of the top in generally diametrally opposed relation, each gas inlet being covered by a small diffusing screen, a large diffusing screen spaced a short distance from the small screens and extending substantially across the interior of the hood in general parallelism with the top of the hood, means for supplying an inert gas suitable as a welding atmosphere to the hood only through the inlets and their screens, and a welding electrode projecting into the hood through its top and the large screen.

References Cited in the file of this patent
UNITED STATES PATENTS

| | | |
|---|---|---|
| 2,918,563 | Ternisien et al. | Dec. 22, 1959 |
| 2,977,457 | Houldevoft | Mar. 28, 1961 |
| 3,027,447 | Browning et al. | Mar. 27, 1962 |